US008812589B2

(12) United States Patent
Jain et al.

(10) Patent No.: US 8,812,589 B2
(45) Date of Patent: Aug. 19, 2014

(54) METHOD AND SYSTEM FOR DOCUMENT-DRIVEN MESSAGE-BASED COMMUNICATION

(75) Inventors: Gaurav Jain, Delhi (IN); Priyank Choudhury, Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 1504 days.

(21) Appl. No.: 11/799,883

(22) Filed: May 2, 2007

(65) Prior Publication Data

US 2014/0032681 A1 Jan. 30, 2014

(51) Int. Cl.
*G06F 15/16* (2006.01)
*H04L 29/06* (2006.01)

(52) U.S. Cl.
CPC ............... *G06F 15/16* (2013.01); *C06Q 10/10* (2013.01); *H04L 29/06* (2013.01)
USPC ........... 709/204; 709/205; 709/206; 709/207

(58) Field of Classification Search
CPC ........ G06F 15/16; G06Q 10/10; H04L 29/06; H04L 29/08072; H04L 29/06027; H04L 12/581
USPC .......................................................... 709/204
See application file for complete search history.

(56) References Cited

U.S. PATENT DOCUMENTS

| 7,353,252 | B1* | 4/2008 | Yang et al. ..................... 709/204 |
| 2004/0107256 | A1* | 6/2004 | Odenwald et al. ............ 709/205 |
| 2004/0236830 | A1* | 11/2004 | Nelson et al. ................. 709/204 |
| 2005/0216556 | A1* | 9/2005 | Manion et al. ................ 709/204 |
| 2006/0259957 | A1* | 11/2006 | Tam et al. .......................... 726/3 |
| 2007/0135099 | A1* | 6/2007 | Taylor et al. ............... 455/412.1 |

OTHER PUBLICATIONS

Microsoft Corporation, Microsoft Office Live Meeting Feature Guide, Jan. 2005.*

* cited by examiner

*Primary Examiner* — Joseph Greene
(74) *Attorney, Agent, or Firm* — Shook Hardy & Bacon LLP

(57) ABSTRACT

A system for document-driven message-based communications may include a presentation module to open a subject electronic document at a first electronic system; an attribute detector to detect that the subject electronic document is a message-enabled document; an RTC module to initiate an RTC session between a first user associated with the first electronic system and a second user associated with a second electronic system; and a storing module to store one or more RTC messages generated during the RTC session as associated with the subject electronic document. The message-enabled document includes an infrastructure required for real time communications (RTC).

20 Claims, 11 Drawing Sheets

METHOD AND SYSTEM FOR DOCUMENT-DRIVEN MESSAGE-BASED COMMUNICATION

TECHNICAL FIELD

Example embodiments relate to a method and system for document-driven message-based communications.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A document may be described as a set of information designed and presented as an individual entity. A publication is one example of a document. It may contain logical subunits such as parts, sections, or chapters; but it is typically created, updated, and presented as a single unit. An electronic document is an electronic representation of a paper document encoded in some machine processable form.

Conventionally, if a document needs to be discussed, one option is to use e-mail-based or on-line collaboration, which allows participants of a discussion to add comments into the document and to share them with the other participants. Alternatively, participants can discuss the document in person, without the use of any computer system. Another option is to set up an on-line meeting or a conference, or a telephone or video conference. The participants can then discuss the document, and exchange their thoughts. The conventional methods, however, may be cumbersome, overly complicated, and resource-intensive, especially if only a brief discussion of the document is desired. Even if an on-line meeting is set up, the information exchanged among participants in the course of the on-line meeting may not be linked to or associated with the document. Therefore, there may be no connection between the document itself and the content of the discussion pertaining to the document. Whenever there is a need to associate the content of the discussion pertaining to the document with the document, a user may need to manually modify the document in order to include the discussion, and then to circulate the modified document to all the participants.

E-mail and on-line collaboration may include one participant adding comments to the document and then making the document with comments available to other participants. However, the communications provided by these methods is not occurring in real-time (e.g., in some existing systems that provide on-line collaboration, the users need to manually synchronize their comments with the server).

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
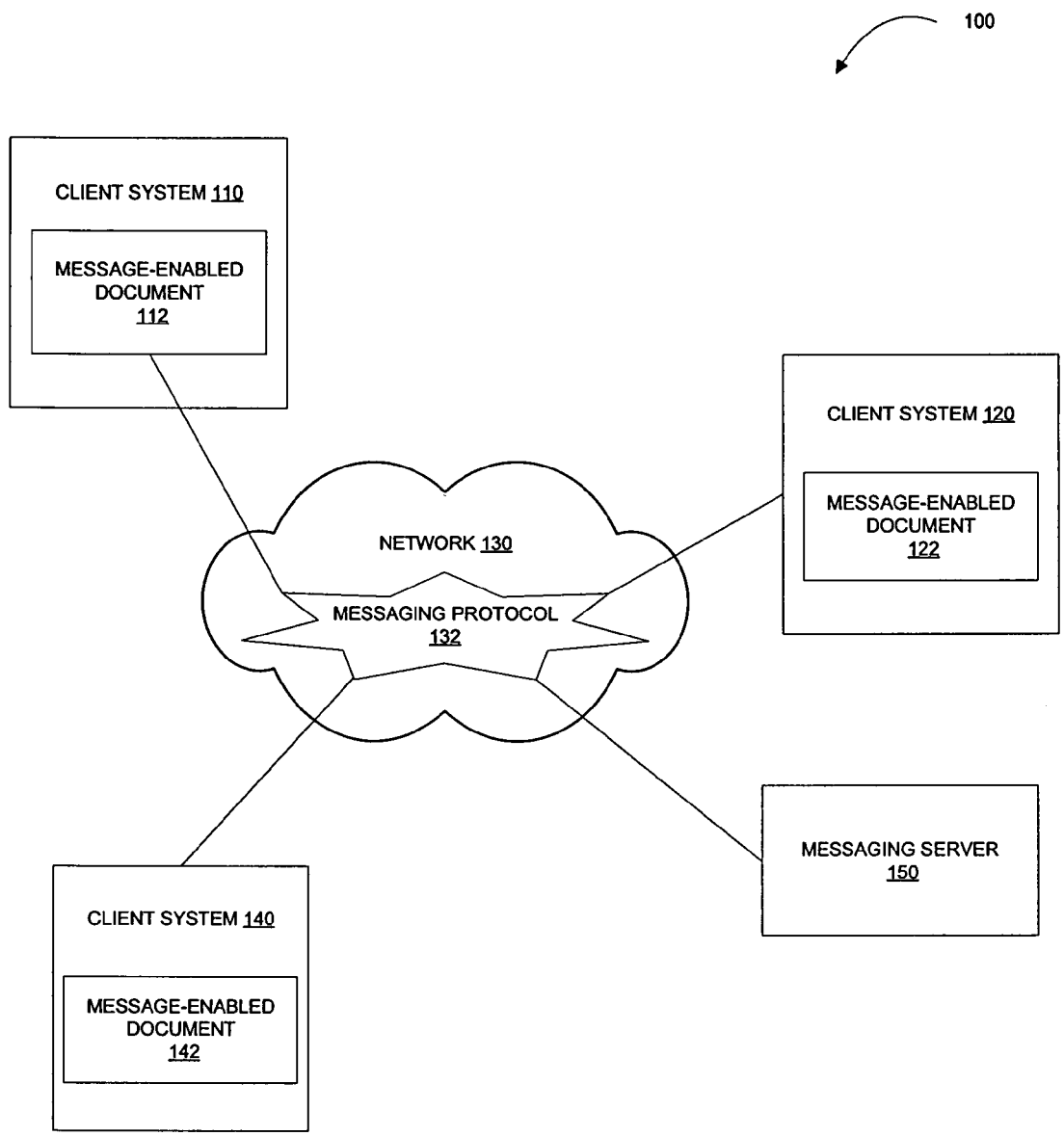
FIG. 1 is a block diagram showing a network environment within which a method and system for document-driven message-based communications may be implemented, in accordance with an example embodiment.

A method and system are described to provide document-driven message-based communications in the context of an application for creating, viewing, and manipulating electronic documents. It will be noted, that, for the purposes of this description, the terms "document" and "electronic document" may be used interchangeably.

In one example embodiment, an electronic document may be utilized as a driver of communications between a number of users participating in a discussion of the document. Such communications among participants may be implemented by embedding any data required for real time communications in the document itself. A document that is provided together with the data required for real time communications may be termed a message-enabled document. Thus, two or more users (that may be referred to as participants) may engage in real-time message-based communications using the functionality embedded in the document itself. Upon the completion of a communications session, the information exchanged among the participants in the course of the communications session is saved as part of the document.

Example method and system makes it possible for participants to discuss a document and to share their views and opinions in real-time. A list of participants that are permitted to engage in document-driven message-based communications may be defined by the author of the document at the time of document creation. A list of participants may be subsequently modified, e.g., by a user that has certain access privileges.

Real time communications (RTC) refers to a technique where the messages sent from one participant to another are processed and presented to viewers as they occur (or at least soon after they occur). In one example embodiment, the messages sent from one participant to another are processed and presented to recipients not on a periodic or batch basis. As mentioned above, in one example embodiment, the real time communications may be driven by the document itself, as the document contains the infrastructure required for real time communications. A supporting application capable of presenting and manipulating electronic documents may be configured to provide a client interface to messaging protocols (e.g., Jabber® and Yahoo!® Messenger® protocol). A messaging server, e.g., a server in the public or private domain that supports a messaging protocol (e.g., Jabber® server and Yahoo!® Messenger® server) may be configured to permit the supporting application to communicate with other network entities.

In one example embodiment, the messages generated in the course of an RTC session are encapsulated in an eXtensible Markup Language (XML) stream inside the document itself, which may allow participants to resume discussions without the need to retrieve messages from the messaging server. An example synchronization mechanism provides a method to synchronize all the messages that participants may have missed while they were off-line. Any comments associated with a message-enabled document can be read by a participant while the participant is off-line. Comments to a document can also be added by a participant while the participant is off-line. Any comments that are entered by a participant while off-line may be synchronized with the comments and edits entered by other participants at the time the participant joins an RTC session associated with the document. The system described herein may be configured to operate as a server-independent system. Specifically, the participants may agree to change a messaging server and still be able to discuss the subject document and to have access to previous discussions.

In some embodiments where the system and method to permit document-driven message-based communications is implemented to be utilized with documents in a page description language (e.g., PostScript or Portable Document Format (PDF)), reference to the message dictionary is added to the trailer dictionary of the PDF file format. In some example embodiments the document may also be formatted in the Word format or a rich text format (RTF), XML Paper Specification (XPS), Open Document Format (ODF) or some other fixed document file format.

The trailer dictionary is the entry point to the document's contents. The message dictionary identifies the document as a discussion-enabled document, and contains all the required information for the participants to engage in real-time discussion using the document. As mentioned above, the Message dictionary may have the following attributes: the protocol to be used for message-based communications among the participants; an array of Instant Messaging identifications (IM IDs) of each participant; a user-friendly name of the document; a unique ID for the document to identify the document even when the document's filename changes; and a reference to an XML stream containing the discussion history.

A non-null reference to message dictionary in the PDF indicates that the document has been enabled for discussion. The messaging protocol could be one of several protocols that the viewing applications at all ends implement (e.g., Jabber protocol). The IM IDs corresponding to each participant are used to contact the rest of the participants, and the user friendly name is used so that the participants can easily remember what the document is called (this name does not change even if the file is renamed to a different file name). The universally unique ID is generated only once when the document is created, and is used to identify the document on a computer (this is used to notify a user of an incoming message request when the document is not opened at the user's end).

FIG. 1 shows an example network environment 100, within which a method and system for collaborative editing may be implemented. The network environment 100 may include a plurality of client systems—a client system (or simply client) 110, a client system 120, and a client system 140. The client systems 110, 120, and 140 may be in communications with each other via a network 130. The communications network 130 may be a public network (e.g., the Internet, a wireless network, a public switched telephone network (PSTN), etc.) or a private network (e.g., LAN, WAN, Intranet, etc.).

Each of the client systems 110, 120, and 140 may host an application that is capable of opening an instance of a message-enabled document. The message-enabled document may be stored, e.g., at a shared repository. As shown in FIG. 1, the client system 110 opened a message-enabled document 112, the client system 120 opened a message-enabled document 122, and the client system 140 opened a message-enabled document 142. The reference numerals 112, 122, and 142 refer to three instances of the same electronic document being opened at three different client systems. The client systems 110, 120 and 140 may be configured, in one example embodiment, to provide real-time communications via a messaging protocol 132 that may be provided by a messaging server 150. As mentioned above, the message-enabled document opened by the clients 110, 120, and 140 may include, within its definition, the infrastructure required for real time communications. A system to generate such message-enabled document may be discussed with reference to FIG. 2.

Figure 2:
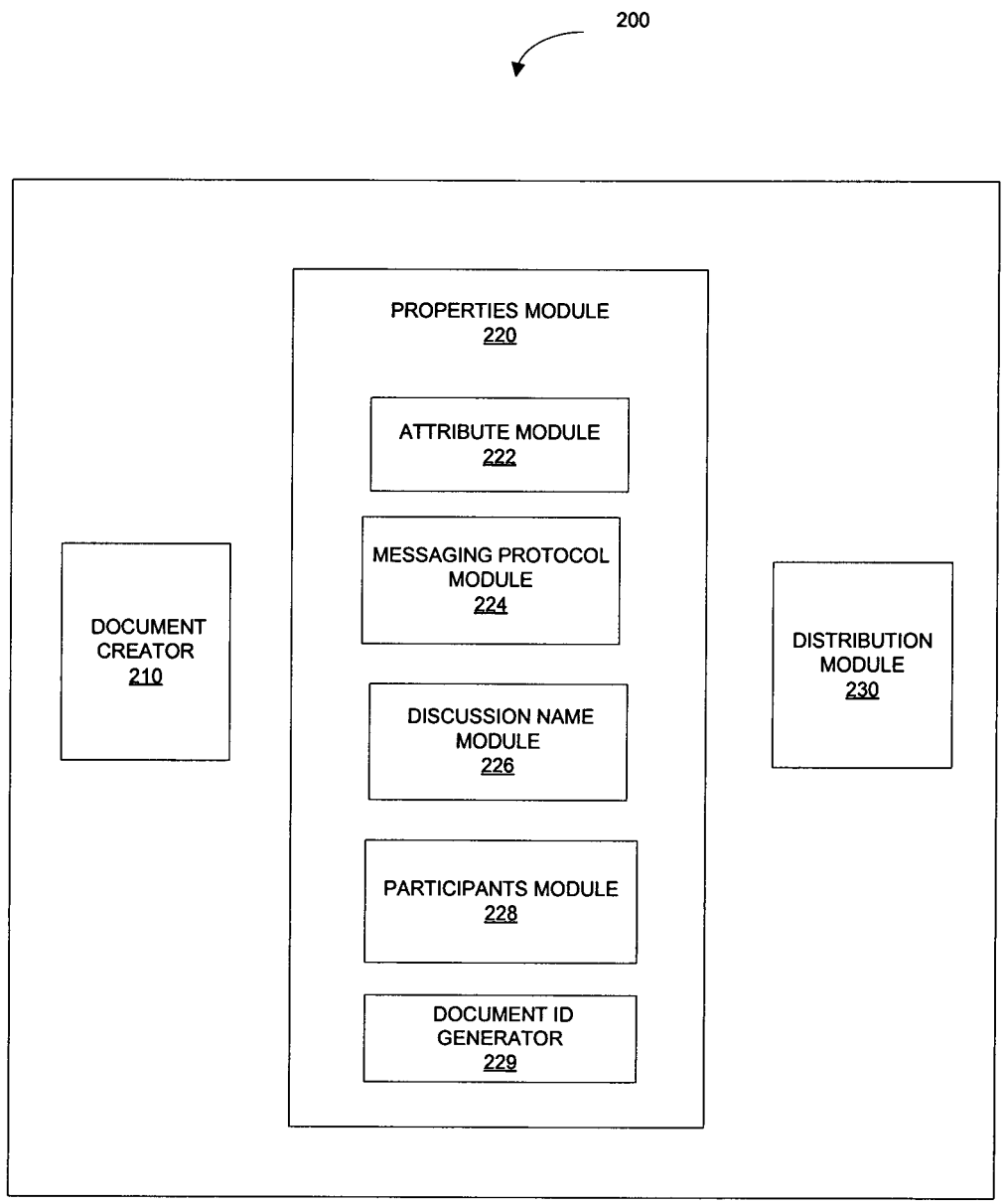
FIG. 2 is a block diagram illustrating a system, in accordance with an example embodiment, to generate a message-enabled document.

FIG. 2 shows a block diagram illustrating an example system 200 to generate a message-enabled document. The system 200 may include a document creator 210, a properties module 220, and a distribution module 230. The creator 210 may be configured to permit a user to create an electronic document. The properties module 220 may be configured to permit a user, e.g., the author of the electronic document or another user with appropriate permissions settings, to set various attributes and properties for the electronic document. The properties module 220, in one example embodiment, includes an attributes module 222, a messaging protocol module 224, a discussion name module 226, a participants module 228, and a document ID generator 229. The attributes module 222 may be configured to permit a user to designate a document as a message-enabled document. The messaging protocol module 224 may be configured to permit a user to select a messaging protocol to be utilized for a document-driven RTC session. The discussion name module 226 may be configured to permit a user to select a user-friendly name for the document. The participants module may 228 be configured to permit a user to choose one or more users that may participate in TTC sessions driven by the document. The document ID generator 229 may be configured to generate a unique ID for the document. One example technique for generating a unique ID for a message-enabled document is described further below with reference to FIG. 4.

Also shown in FIG. 2 is the distribution module 230. The distribution module 230 may be configured to permit the author of the document (or a user with appropriate permission settings) to circulate the message-enabled document to the users listed in a participants list associated with the document. Various operations performed by the system 200, according to an example embodiment, may be discussed with reference to FIG. 3.

Figure 3:
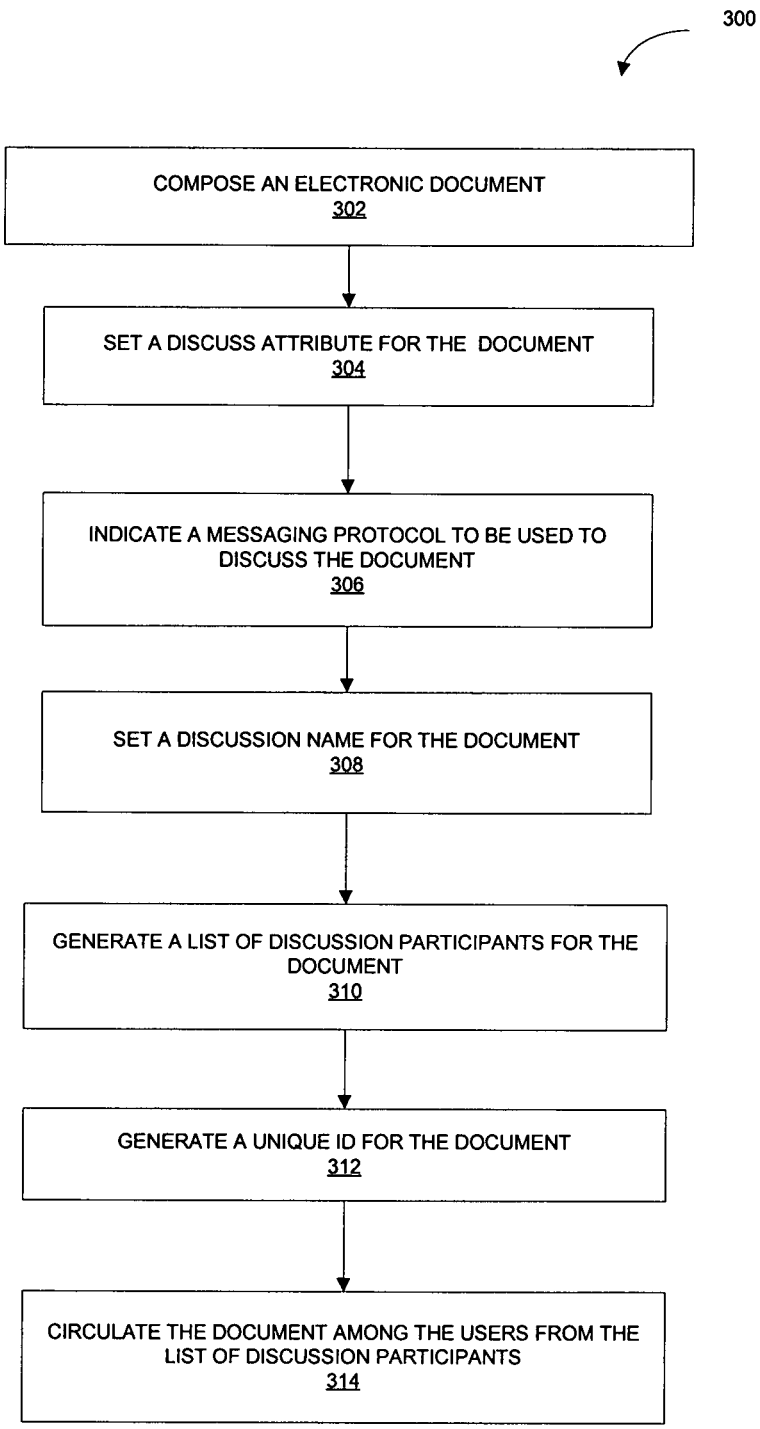
FIG. 3 is a flow chart illustrating a method to generate a message-enabled document, in accordance with an example embodiment.

FIG. 3 is a flow chart illustrating a method 300 to generate a message-enabled document, in accordance with an example embodiment. The method 300 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in any of the modules shown in FIG. 2.

As shown in FIG. 3, the method 300 commences with operation 302, where an author utilizes a creating application (e.g., Adobe® Acrobat®) to compose a document, which the author intends to send to a list of recipients (the participants of future document-driven RTC sessions) for review, discussion, or both. After composing the document, the author opens a dialog box showing the document's properties. The author specifies that he wishes to discuss the document with a list of participants (a discuss attribute is set at operation 304). Where the embodiment is implemented in Adobe® Acrobat® environment, a message dictionary is created in the file's trailer dictionary. A trailer dictionary is the entry point to the document's contents, as described in the Portable Document Format (PDF) Reference 1.6, which is herein incorporated by reference.

The author specifies the messaging protocol that he wishes to use for the communications, at operation 306. The messaging protocol may be set in a Discuss attribute (that may be identified as P) of the message dictionary. At operation 308, the author specifies for the document a user-friendly name that can be used to identify this document. This user-friendly name may be configured to not change even if the document's file name is changed. The name entered by the user is set in the DocName attribute of the message dictionary.

At operation 310, the author specifies the list of participants (e.g., including himself) who can subsequently participate in the real-time message-based communications. The author also specifies each participant's IM ID. The creating application creates the Participants array in the message dictionary. Each element in the array is the IM ID, the Instant Messaging ID that is compatible with a specific messaging protocol that the author has specified for that participant. When the document is saved, the creating application generates, at operation 312, a unique ID for the document and sets this value in the DocID field in the message dictionary. An example method to generate a unique ID for a message-enabled document is discussed below with reference to FIG. 4. At operation 314, the document is circulated among all the intended participants.

Figure 4:
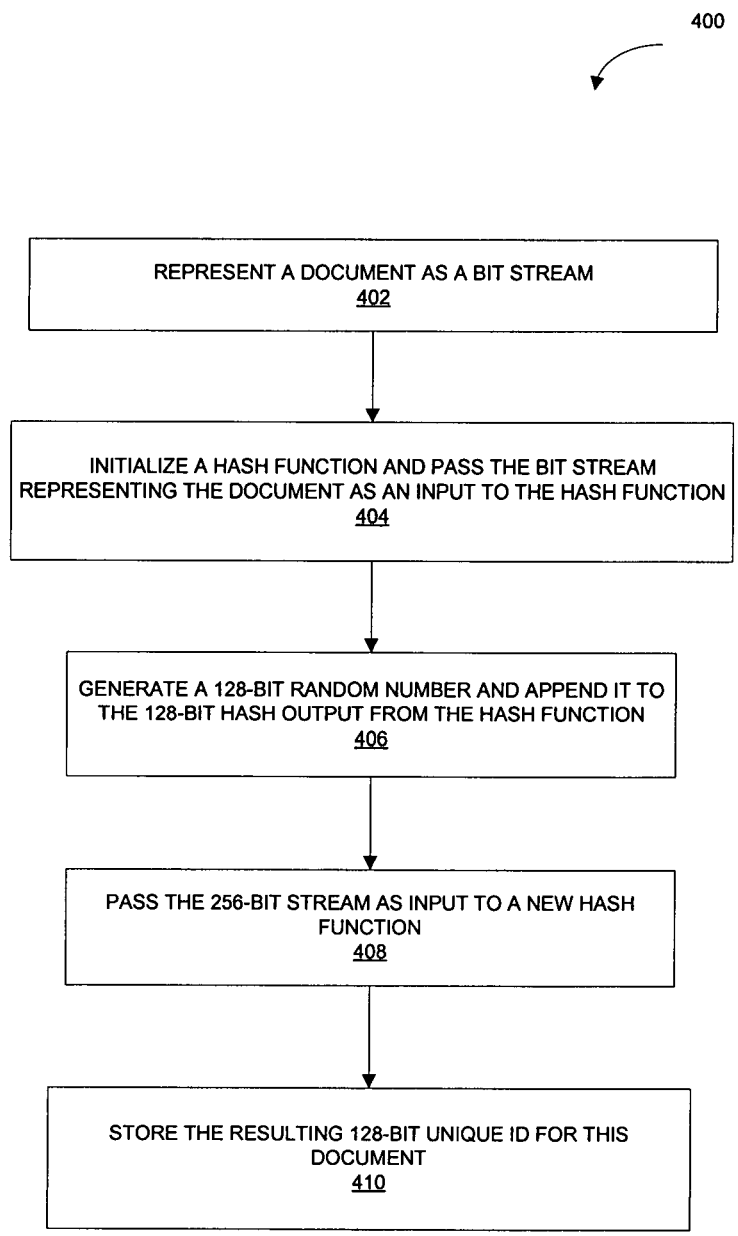
FIG. 4 is a block diagram illustrating a method, in accordance with an example embodiment, to generate a unique ID for a message-enabled document.

FIG. 4 is flow chart illustrating a method 400, in accordance with an example embodiment, to generate a unique ID for a message-enabled document. The method 400 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in any of the modules shown in FIG. 2.

As shown in FIG. 4, at operation 402, the document is represented as a bit stream. A hash function is initialized at operation 404 and the bit stream is passed to it as an input. At operation 406, a 128-bit random number is generated. The generated random number is appended to the output of the hash function. The resulting bit stream is provided to another hash function as a new input, at operation 408. The operation 408 results in a 128-bit unique ID for the message-enabled document, which is stored at operation 410.

Figure 5:
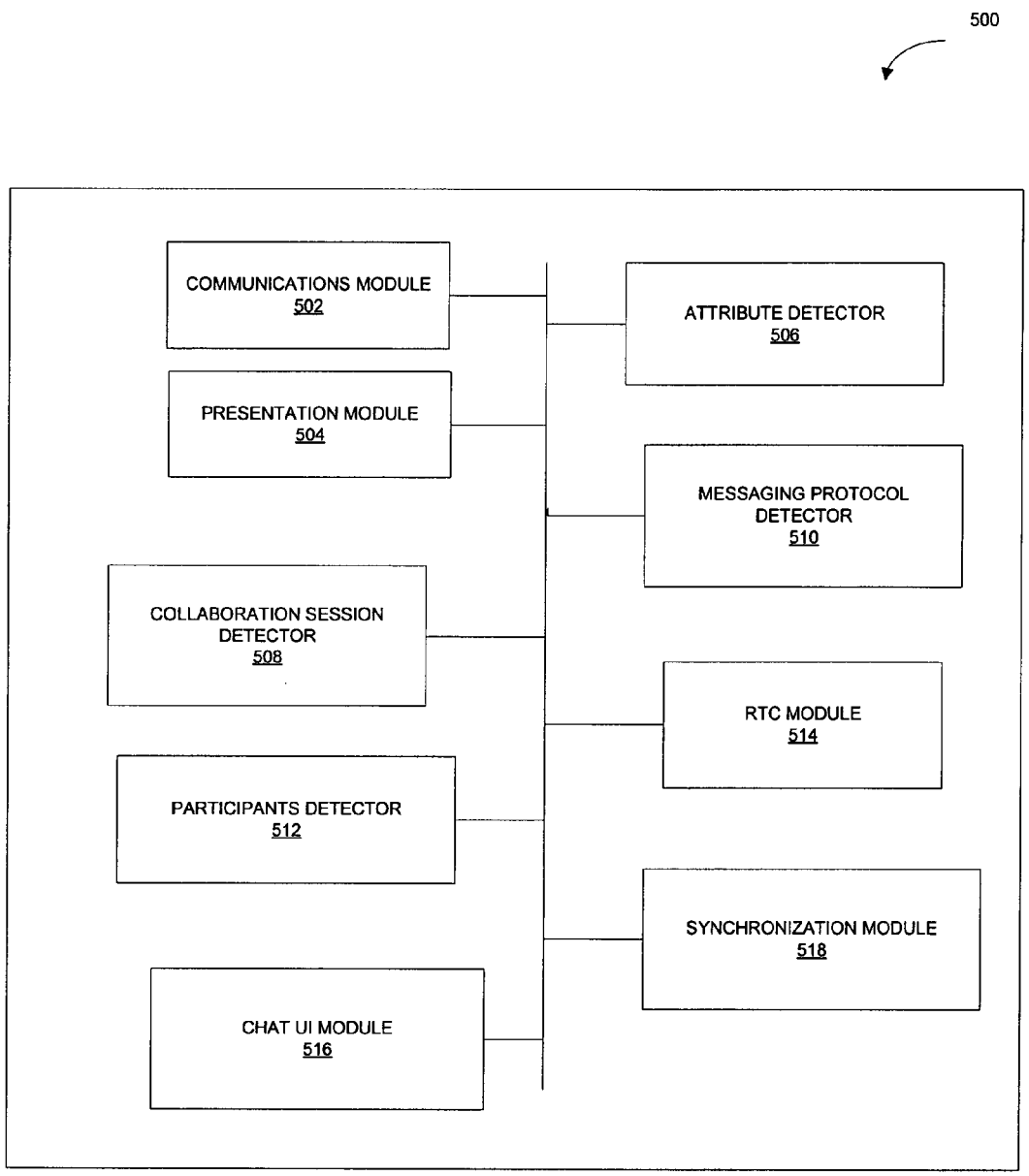
FIG. 5 is a block diagram illustrating a system, in accordance with an example embodiment, to permit document-driven message-based communications.

FIG. 5 is a block diagram illustrating a system 500, in accordance with an example embodiment, to permit document-driven message-based communications. The system 500 comprises a communications module 502, a presentation module 504, an attribute detector 506, a collaboration session detector 508, a messaging protocol detector 510, and a participants detector 512. The communications module 502 may be configured to receive a request to open a document. The presentation module 504 may be configured to open an electronic document. The attribute detector 506 may be configured to determine that the electronic document is a message-enabled document, e.g., by detecting a Discuss attribute.

The collaboration session detector 508 may be configured to detect a request to initiate a collaboration session (an RTC session driven by the document). A request to initiate a collaboration session may be an explicit request, or a positive reply in response to an inquiry regarding whether a user would like to initiate or join a document-driven RTC session. In order to initiate a document-driven message-based session, the system 500 utilizes the messaging protocol detector 510 to determine a messaging protocol associated with the document. The participants detector 512 may be configured to detect a list of participants associated with the message-enabled document.

Also shown in FIG. 5, are an RTC module 514, a chat UI module 516, and a synchronization module 518. The RTC module 514 may be configured to send invitations to join a collaboration session to users listed in the participants list associated with a message-enabled document. The RTC module 514 may utilize the messaging protocol determined by the messaging protocol detector 510. The chat UI module 516 may be configured to display a chat window with on-line status information for users from the list of participants. The synchronization module 518 516 may be configured to bring a local copy of the message history associated with a message-enabled document with the most current version of the message history. The modules of the system 500 may be, in one example embodiment, part of a document viewing application (or simply a viewing application). Various operations performed by the system 500, according to an example embodiment, may be discussed with reference to FIG. 6 and FIG. 7.

Figure 6:
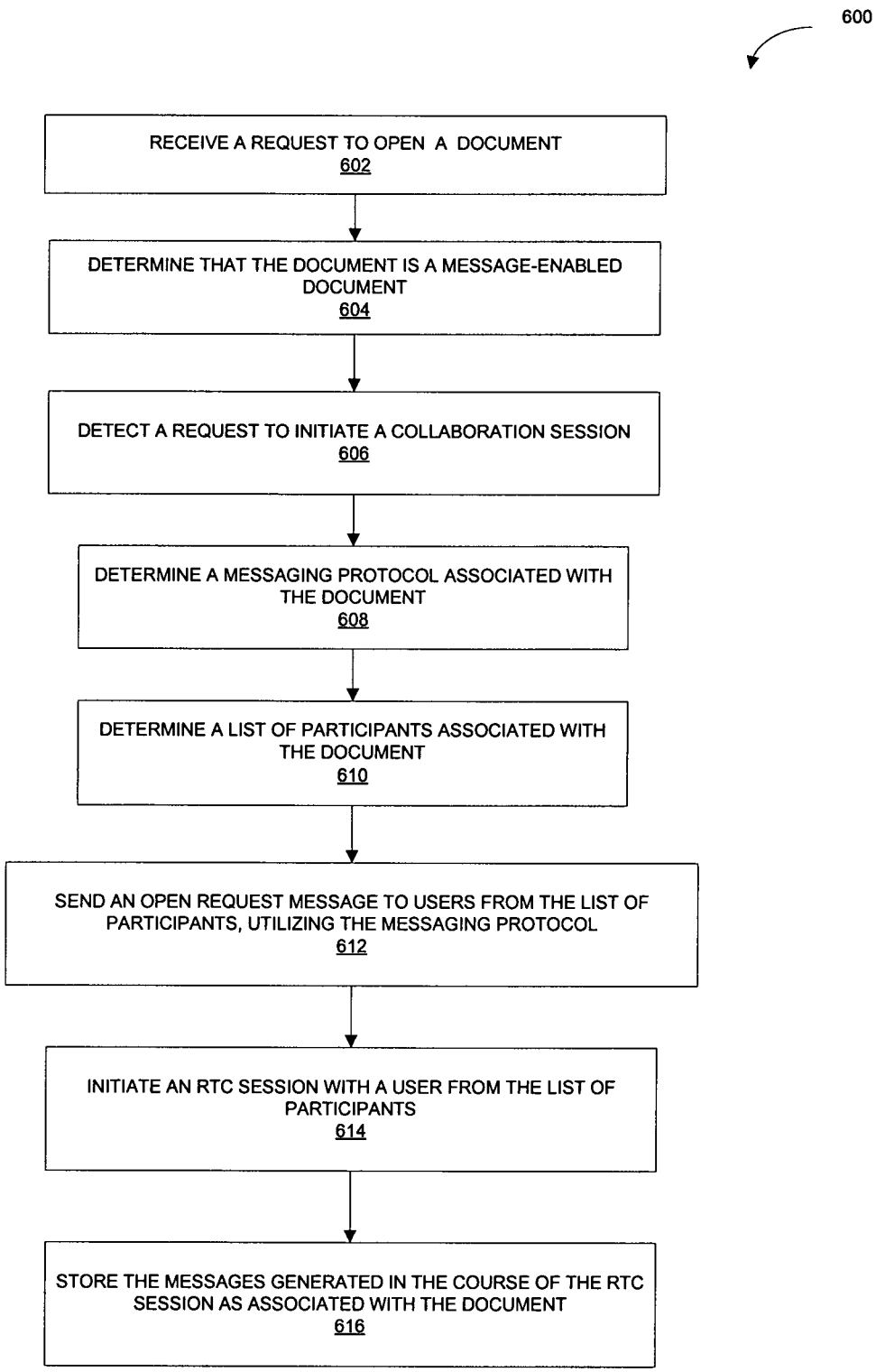
FIG. 6 is a flow chart illustrating a method for document-driven message-based communications, in accordance with an example embodiment.

FIG. 6 is a flow chart illustrating a method 600 for document-driven message-based communications, in accordance with an example embodiment. The method 600 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in any of the modules shown in FIG. 5.

As shown in FIG. 6, at operation 602, the communications module 502 receives a request to open an electronic document. While the document is being opened by the presentation module 504, the attribute detector 506 detects the presence of the message dictionary in the file's trailer dictionary (e.g., the Discuss attribute associated with the document), and recognizes that the document is a discussion-enabled document. A confirmation dialog is then presented to the user, asking the user whether he wishes to collaborate on this document (e.g., whether the user wishes to engage in real-time discussion) with the rest of the participants. The collaboration session detector 508 treats a positive indication from the user as a request to initiate a collaboration session, at operation 606. If, however the user indicates that he does not wish to collaborate on the document, then no further action is taken with respect to the communications, and the presentation module 504 presents the document to the user just like any other document.

In response to the collaboration session detector 508 detecting a request to initiate a collaboration session, the messaging protocol detector determined a messaging protocol associated with the document at operation 608, the participants detector parses the list of participants (including their IM IDs) associated with the document at operation 610. The viewing application also reads a user-friendly name of the document and the unique ID of the document. The values associated with a user-friendly name of the document and the unique ID of the document may be stored in the DocName and DocID fields respectively in the message dictionary.

The open-request message, in one example embodiment, may also include a list of sequence numbers, one for each of the participants except the participant to whom the message is being sent. The sequence number corresponding to each participant indicates the sequence number of the last message that was sent by that participant. In other words, the list of sequence numbers that are sent as part of the open-request message indicate the message history that the sender of the message has with him. This information may be used by other participants to update their local message history, if necessary.

The RTC module sends, at operation 612, open request messages to users from the list of participants inviting them to join a collaboration session. The message may include the user-friendly name of the document and the unique ID of the document. An RTC session utilizing the messaging protocol is initiated at operation 614. The chat UI module then displays a chat window in the application window (e.g., next to or adjacent to the document window), along with icons representing each of the participants. These icons may be shown greyed initially, since the protocol will now handshake with the other participants to find out who is ready to start the discussion.

The viewing application then waits for an open-reply message from each of the other participants. An open-reply message may include a code indicating whether the participant wishes to engage in the discussion or not. For each participant that wishes to engage in the discussion, the viewing application changes the state of the corresponding icon to 'active' in the chat window. If an open-reply message is not received within a fixed timeout period, the viewing application treats that as a denial of connection request.

The open-reply message may also include a list of sequence numbers, one for each of the participants except the participant who is receiving this message—similar to those in the open-request message described above. The viewing application compares the sequence numbers that it receives in the open-reply against the last message number that it has retrieved from the discussion that was stored locally in the file. If the sequence number of some of the participants in the received message is greater than the one in the local stream, the synchronization module 518 composes a synchronize-request message and sends it to the other end.

The synchronize-request message may include a list of participant's IM IDs along with a range of sequence numbers of messages for that participant which the viewing application is requesting from the other end. The viewing application then waits for a synchronize-reply message from the other end containing an XML stream name. Following the synchronize-reply message, the viewing application receives an XML stream containing the contents of the messages that the viewing application had requested—the stream name received earlier is used to identify that this is the stream containing the data that was requested. The viewing application merges these messages into its local copy, and displays this merged history in the chat window. Some or all of the operations related to synchronization of the message history of a participant may be performed by the synchronization module 518. Further details regarding synchronization techniques are discussed further below. The viewing application may receive a synchronize-request message from the participant if the participant was not up-to-date, and it will reply with the synchronize-reply message in a similar fashion.

While the document is open for discussion, the participants may exchange messages utilizing the RTC module 514 and the chat UI module 516. At the end of the discussion session, the document is saved together with the messages generated during the document-driven RTC session (operation 616 of FIG. 6), e.g., by generating an XML stream of complete discussion and embedding it into the Contents stream in the message dictionary.

Figure 7:
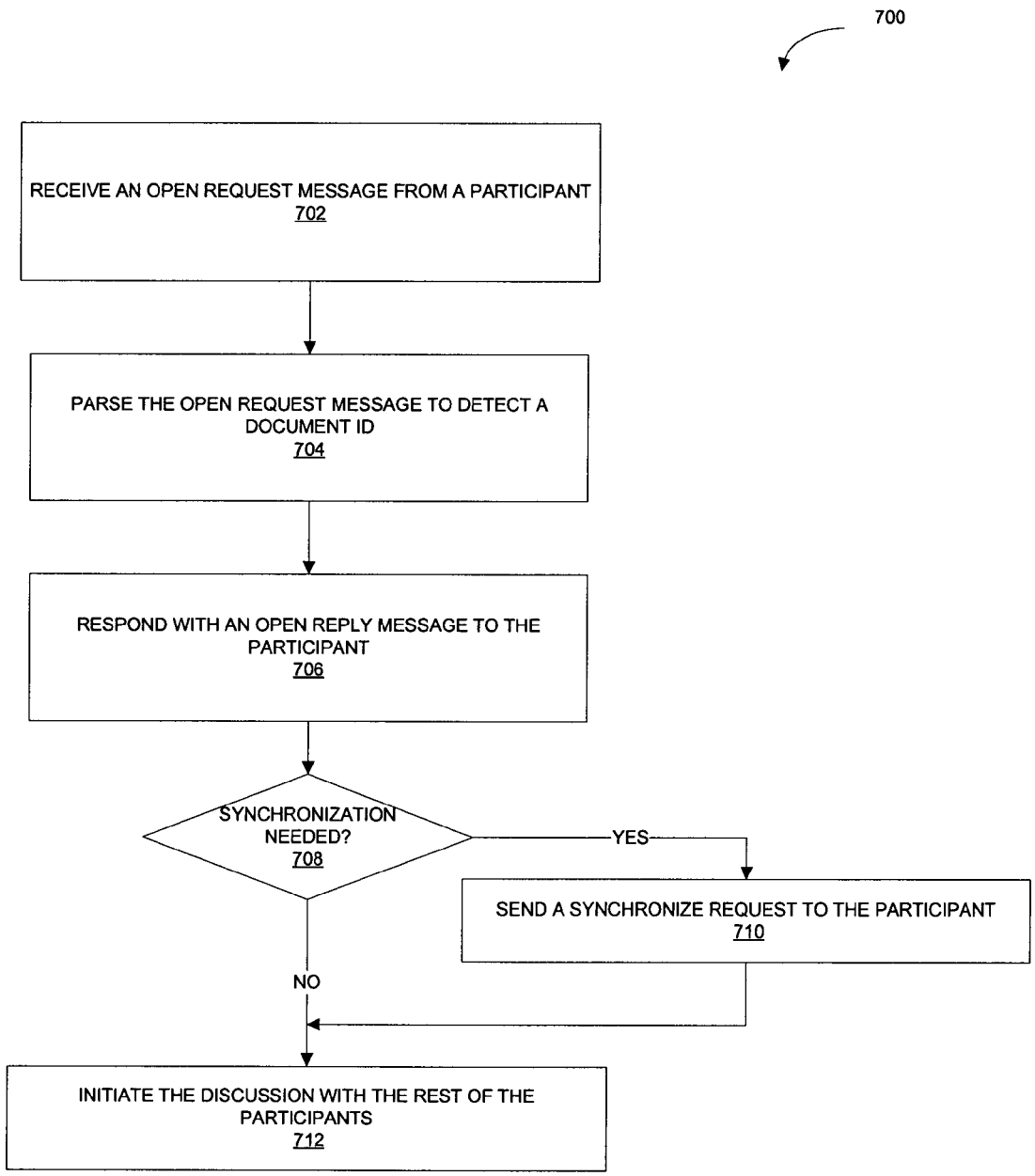
FIG. 7 is a flow chart illustrating a method to join a document-driven message-based communications session, in accordance with an example embodiment.

FIG. 7 is a flow chart illustrating a method 700 to permit a user to join a document-driven message-based communications session, in accordance with an example embodiment. The method 700 may be performed by processing logic that may comprise hardware (e.g., dedicated logic, programmable logic, microcode, etc.), software (such as run on a general purpose computer system or a dedicated machine), or a combination of both. It will be noted, that, in one example embodiment, the processing logic may reside in any of the modules shown in FIG. 5.

As described above, an open-request message may be sent across to the participants listed in the participants list associated with a message-enabled document. It could be that some of those participants are on-line, but do not have the document already open in front of them. However, a daemon application (e.g., a process similar to an "acrotray" provided with the Adobe® Acrobat ®) is running at the computer system associated with that participant. The daemon application may receive the open-request message on behalf of the application (operation 702). The open-request message is parsed and the user-friendly document name as well as the unique document ID is extracted from the message (operation 704). The daemon application then pops up a message to the user notifying him that the sender wishes to collaborate on/discuss the document. The message may show the user-friendly name of the document that needs to be discussed to the user.

If the user selects 'Yes,' then the daemon tries to locate the document on the user's computer using the unique ID associated with the document (or by reading the preferences corresponding to the discussion). If it is able to locate the document, it opens the document in the viewing application. Otherwise, it asks the user to locate the document himself. The contents of the open-request message are passed on to the viewing application when the document is opened.

The viewing application then composes an open-reply message corresponding to the open-request message it received (operation 706), and sends it to the originator of the open-request message. The open-reply message may include the sequence number list, as described above. The viewing application also reads the sequence number list it received in the open-request message to determine if it needs to synchronize itself with the latest messages (operation 708) and, if so, sends the synchronize-request message (operation 710).

The viewing application initiates the discussion with the rest of the participants (operation 712) in the similar manner as described above.

In one example embodiment, user who had decided not to engage in a discussion when he had initially opened the document can still join a discussion at a later time. He can simply click on a button in the application window "Initiate/Join Discussion". On clicking the button, the viewing application performs operations to open the document as discussed above with reference to FIG. 6.

A user can leave a discussion that he is already participating in by simply clicking a button "Terminate/Leave Discussion." On clicking the button, the viewing application sends a close-request message to all the other participants. The viewing application waits for a close-reply message from each of the participants. On receiving the close-reply message from each of the participants, the viewing application disables the chat window, and generates an XML stream of complete discussion and embeds it into the Contents stream in the message dictionary. If a close-reply message is not received within a fixed timeout period, the viewing application still does what it would do in response to receiving a close-reply message. The document may then be encrypted using public key encryption mechanism.

Figure 8:
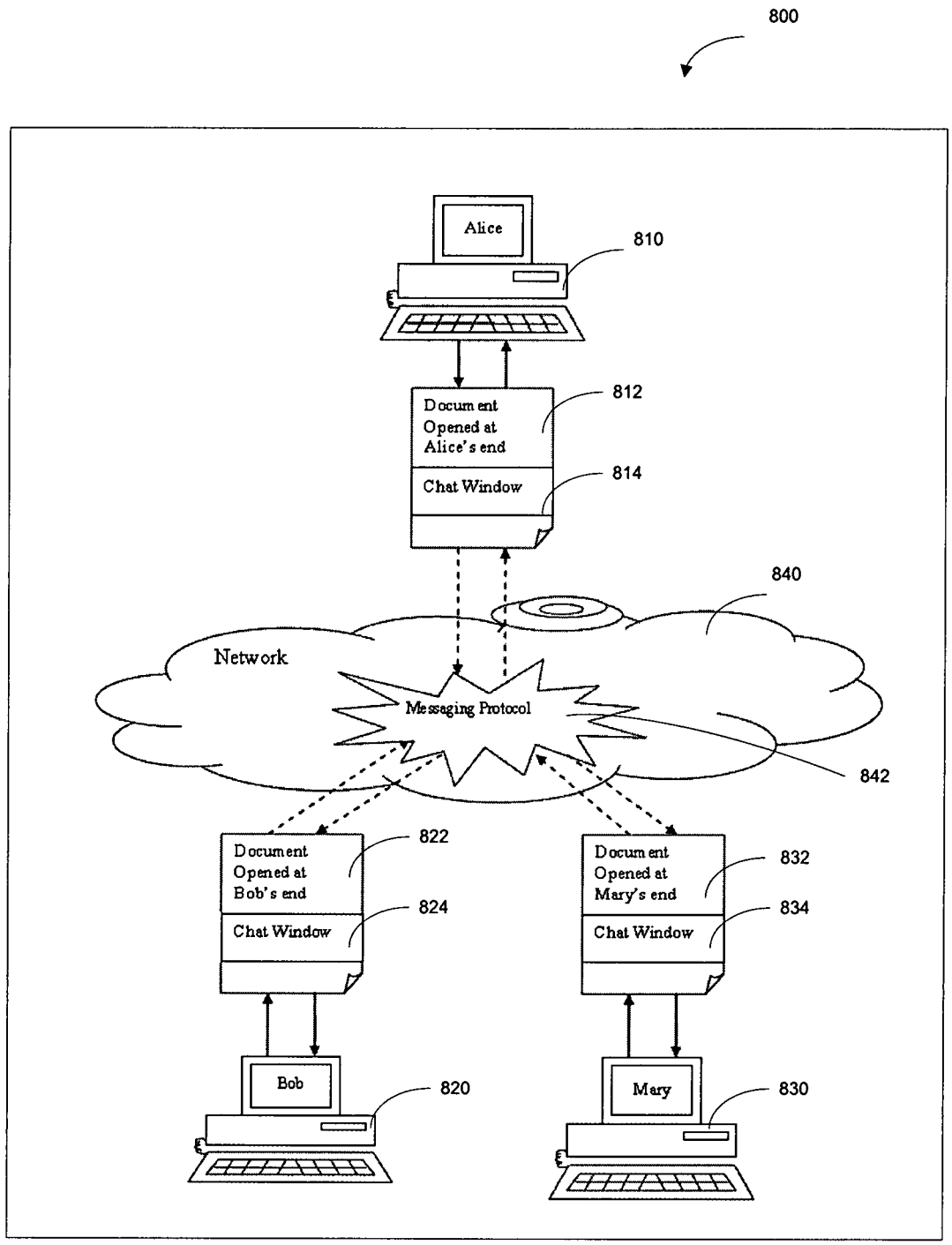
FIG. 8 is a network diagram illustrating participants of a document-driven message-based communications session, in accordance with an example embodiment.

FIG. 8 is a network diagram 800 illustrating participants of a document-driven message-based communications session, in accordance with an example embodiment. As shown in FIG. 8, three users, Alice, Bob, and Mary engage in real-time message-based discussion via their respective electronic systems 810, 820, and 830. The electronic systems 810, 820, and 830 are in communications with each other via a network 840 in general and via a messaging protocol 842 in particular. A document 812 and a chat window 814 are opened at the electronic system 810. A document 822 and a chat window 824 are opened at the electronic system 820. A document 832 and a chat window 834 are opened at the electronic system 830. In one example embodiment, the document 812, the document 822, and the document 832 are three different instances of the same electronic document that may be stored on a shared file system file repository. The entire chat between Alice, Bob, and Mary that is driven by the document itself may be stored as associated with the document. The chat may be stopped by one or more of the participants and then resumed at a later time.

In one example embodiment, the messages that are sent across using the underlying messaging protocol may be sent in plain ASCII text format. Various control characters may be utilized as specified below. The front slash '/' character is a special control character and is used to start keywords in the message. If '/' appears as part of the actual message, then the sending application escapes it with a back slash '\' to become '\/'. If the '\' character appears as part of a message text, then it is double escaped to '\\'. The application at the receiving end recognizes the control characters, and appropriately un-escapes them if they are part of the actual message.

Various types of messaged are described below.

The open-request message is used to open a connection with another participant. It also serves the purpose of advertising the set of messages that this participant has stored with him, so that other participant may request synchronization if required (using the synchronize-request message).

The open-request message may include the message type; the user-friendly name for the document; the unique ID for the document, a list of key-value pairs, the key being the IMID for a participant and the value being the last message-sequence number of the messages sent by that participant; and the end delimiter.

/Type OPEN_REQUEST /DocName <document's user-friendly name> /DocID <document's unique ID> /SequenceList <no. of pairs> <IMID 1> <Sequence-no. of 1> <IMID 2> <Sequence-no. of 2> .... <IMID n> <Sequence-no. of n> /End The open-reply message may be used to approve/deny an open-request message. This message may also serve the purpose of advertising the list of known messages, similar to the open-request message. The open-reply message may include the message type; a code indicating whether the sender wishes to engage in the discussion or not; a list of key-value pairs, the key being the IMID for a participant, and the value being the last message-sequence number of the messages sent by that participant; and the end delimiter.

/Type OPEN_REPLY /Discuss <Y or N> /SequenceList <no. of pairs> <IMID 1> <Sequence-no. of 1> <IMID 2> <Sequence-no. of 2> .... <IMID n> <Sequence-no. of n> /End The text message may be used to send the actual text messages that are typed by the participants in their chat windows. Each message may have its associated message sequence number which is used for synchronization purposes. The text message may include the message type; a sequence number corresponding to this message, and unique with respect to the sending participant; the timestamp in GMT time zone at which the message was sent (according to the clock at the sender's machine); the message text; and the end delimiter /Type TEXT /SeqNo <sequence no.> /TimeStampGMT <DDMMYYYY-HHMMSS> /Message <actual message text> /End The close-request message may be used to indicate that the sender wishes to close the connection. The close-request message may include the message type and the end delimiter.

/Type CLOSE_REQUEST /End

The close-reply message may be used to confirm that a close-request message was received. The close-request message may include the message type and the end delimiter.

/Type CLOSE_ REPLY /End

The synchronize-request message may be used to request a list of messages from the other end for synchronization of the local message history. The synchronize-request message may include the message type; a list of key-value pairs, the key being the IM ID for a participant, and the value being a range of sequence numbers the contents of which are requested by the sending participant; and the end delimiter.

/Type SYNC_REQUEST /SyncList <no. of pairs> <IMID 1> <Sequence Range of 1> <IMID 2> <Sequence Range of 2> .... <IMID n> <Sequence Range of n> /End Synchronize-Reply Message The synchronize-reply message may be used to return an XML stream containing the range of messages requested through the synchronize-request message. The synchronize-reply message may include the message type; an XML stream name corresponding to the XML stream that is being sent from the other end; and the end delimiter.

/Type SYNC_REPLY /XMLStreamName <file-name of Xml stream> /End

The XML stream is used to store and transfer (or synchronize) the discussions among the various participants. The format of messages may include a single 'message' tag per message that contains the message that is sent by any of the participants. The XML stream is a sequence of message tags. Each message tag may have the following attributes: timestamp_gmt and sender attribute. The timestamp_gmt is the timestamp of the message sending time as timed by the sending participant's machine in Greenwich Mean Time time zone. The sender attribute is the IM ID of the sender of this message.

<message timestamp_gmt="DDMMYYYY-HHMMSS" seq_no="sequence no. of the message" sender="IMID of sender">actual message goes here</message>

The XML stream that is stored in the document itself may be sorted by timestamp, and if there's a conflict, then sorted by the IM ID of the sender. However, there is no sorting requirement on the XML stream that is sent for synchronization of messages.

The different participants may join or leave discussions at will, so it is expected that every participant may not remain up-to-date with what was discussed by some others while he was off-line. The synchronize-request message, in one example embodiment, is designed to address this eventuality by allowing any participant to request another participant for a range of messages that he needs to update. An example scenario is described below.

There are three participants in a discussion over a document, namely Alice, Bob and Mary. Alice sends an open-request to both Bob and Mary, but only Bob wishes to engage in a discussion currently (Mary chooses to join them at a later time). Now both Bob and Alice engage in a discussion, and exchange 6 messages in all (as described below with reference to FIG. 9). Then they both go off-line. At this point, Mary wishes to join the discussion. She clicks on the "Initiate/Join discussion" button provided with the viewing application. The viewing application at Mary's end sends an open-request to both Alice and Bob, with the Sequence List having zero elements (since Mary hasn't got any chat messages yet). Alice chooses to join the discussion. She clicks 'yes' on the pop up request that she got received at her computer, and the document opens up at Alice's end too. Bob is off-line, so he doesn't respond to Mary's request.

The viewing application at Alice's end sends an open-reply message back to Mary, with the Sequence List having 2 elements as follows.

/Type OPEN_REPLY /Discuss Y /SequenceList 2 alice@jabber.org 3 bob@jabber.org 3 /End What this tells Mary is that Alice has the messages from two participants, herself and Bob, each with messages up to sequence number 3. Since Mary wishes to become up-to-date with whatever discussion has happened between Alice and Bob, she sends a synchronize-request message to Alice as follows /Type SYNC_REQUEST /SyncList 2 alice@jabber.org 1,3 bob@jabber.org 1,3 /End What this tells Alice is that Mary is requesting her to send her an XML stream containing six messages, namely messages sent by Alice with sequence numbers 1 to 3 (both inclusive) and those sent by Bob with sequence numbers 1 to 3 (both inclusive). Alice, on receiving the synchronize-request message from Mary, responds with a synchronize-reply message as follows.

Type SYNC_REPLY /XMLStreamName AliceNBobMessages.xml /End

This message includes the name of the XML stream that Alice will send to Mary containing the messages as requested by Mary. Mary receives the synchronize-reply message above, and then waits for a stream transfer from Alice by the name that was shared in the synchronize-reply message. Mary merges her local copy of the messages using the received XML stream, using the timestamp value in the messages to sort her copy. In one example embodiment, for synchronization purposes, if a participant receives the sequence numbers corresponding to the same ID from multiple participants, he will need to choose one of them based on the following algorithm. If the IM ID corresponds to the sender of the synchronize-reply message, then use the message sequence number for this IM ID as the one sent by the sender. Otherwise, choose the message sequence number for this IM ID as the largest of the values sent by the other participants.

The sorted message history is then shown in the chat window at Mary's end, and she is now up-to-date with the discussion. She can now begin her discussion with Alice. Later on, if Bob chooses to join the discussion, he can synchronize himself with the latest in a similar fashion. Thus, all participants are always made up-to-date as soon as they join a discussion, and before they start engaging in the discussion. The sequence numbers that are maintained for each message allow the participants to request incremental updates from other participants, and the time stamps corresponding to each message allow each participant to have exactly the same view of the messages, and in the same order.

Figure 9:
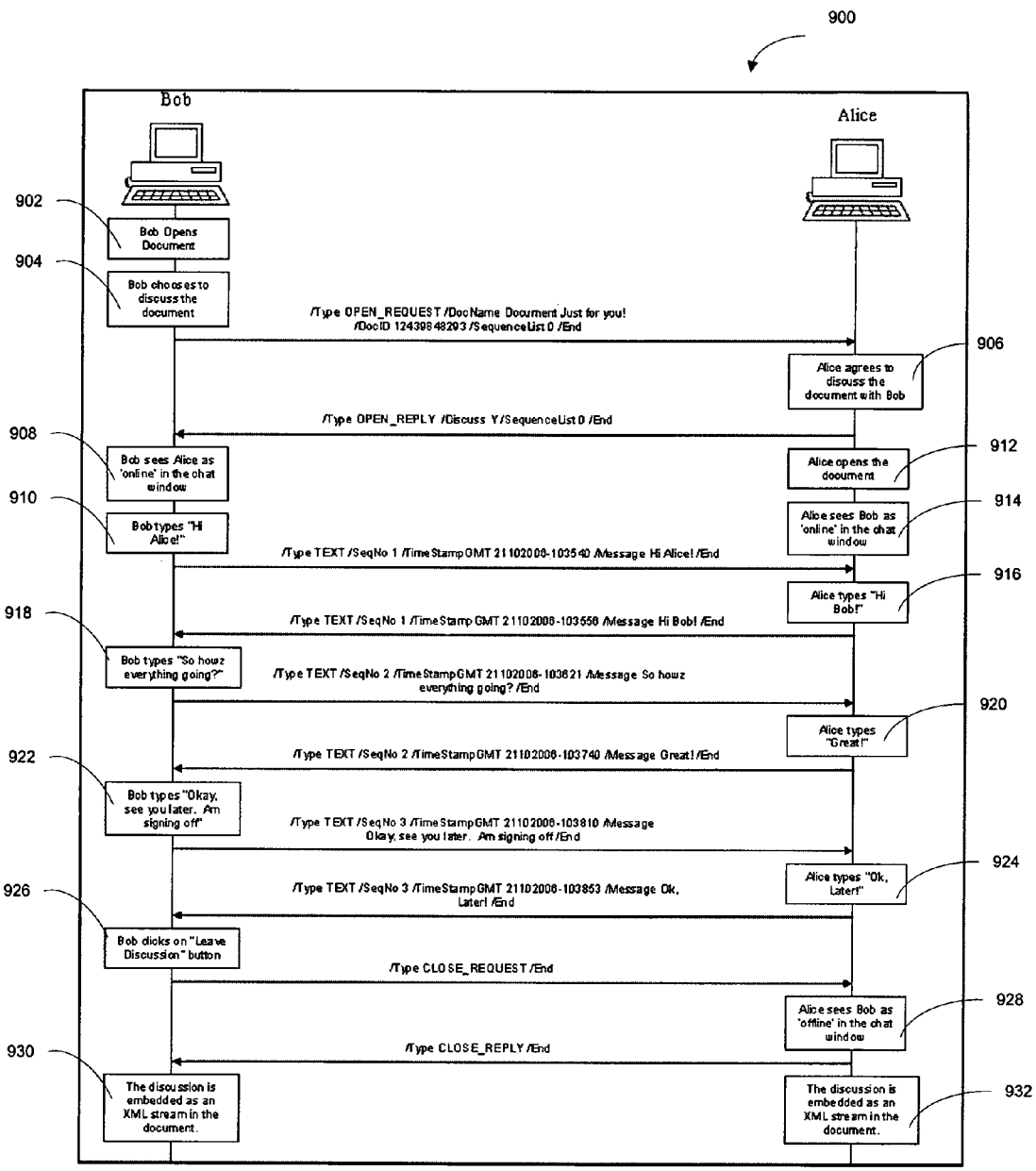
FIG. 9 is diagram illustrating a document-driven message-based communications session, in accordance with an example embodiment.

FIG. 9 is a diagram illustrating a document-driven message-based communications session between two participants, in which two persons (Alice and Bob) engage in a discussion over a document. When the document is created, the following information may be specified by the author. The document is enabled for discussion. The participants are specified as Alice and Bob, and their IM IDs are specified as alice@jabber.org and bob@jabber.org. These IM IDs are set to the Participants array in the message dictionary. The communications protocol is specified as Jabber®, and is set in the P attribute in the message dictionary. The user friendly name of the document is specified as "Document just for you" and set in the DocName attribute in the message dictionary. The unique ID of the document is generated by the authoring application and stored in the DocID attribute in the message dictionary. The message dictionary is referred to from the Discuss attribute of the file's trailer dictionary.

In this example, Alice is the author of the document. She e-mails the document to Bob, so now both of them have a copy of the document.

The PDF file may be represented as follows.

```
%PDF1.5
1 0 obj % Document catalog
<< /Type /Catalog
/Pages 2 0 R
>>
endobj
2 0 obj % Page tree
<< /Type /Pages
/Kids [3 0 R]
/Count 1
>>
endobj
3 0 obj % 1st page
<< /Type /Page
/Parent 2 0 R
/MediaBox [0 0 612 792]
/Contents 6 0 R
>>
endobj
6 0 obj % Page contents
<</Length 35>>
stream
*** Encrypted Page-marking operators ***
endstream
endobj
12 0 obj %XML Stream
<</Length 0 %currently, no chat history is present
>>
stream
endstream
13 0 obj % Message dictionary
<</Length 128
/P Jabber
/Participants [(alice@jabber.org)
(bob@jabber.org)]
/DocName (Document Just for you!)
/DocID (12439848293)
/Contents 12 0 R
>>
xref
...
trailer
<< /Size 8
/Root 1 0 R
/Discuss 13 0 R
...
>>
startxref
495
%%EOF
```

The XML stream that is generated at both ends in this case may be represented as follows.

```
<?xml version="1.0" encoding="Windows-1252"?>
<message     timestamp_gmt="21102006-103540"     seq_no="1"
sender="bob@jabber.org">Hi Alice!</message>
<message     timestamp_gmt="21102006-103556"     seq_no="1"
sender="alice@jabber.org">Hi Bob!</message>
<message     timestamp_gmt="21102006-103621"     seq_no="2"
sender="bob@jabber.org">So howz everything going?</message>
<message     timestamp_gmt="21102006-103740"     seq_no="2"
sender="alice@jabber.org">Great!</message>
<message     timestamp_gmt="21102006-103810"     seq_no="3"
sender="bob@jabber.org">Ok, see you later. Am signing off</message>
<message     timestamp_gmt=\"21102006-103853"     seq_no="3"
sender="alice@jabber.org">Ok, Later!</message>
```

This stream is embedded in the document in the Contents stream in the message dictionary. The PDF file may be represented as follows.

```
%PDF1.5
1 0 obj % Document catalog
<< /Type /Catalog
/Pages 2 0 R
>>
endobj
2 0 obj % Page tree
<< /Type /Pages
/Kids [3 0 R]
/Count 1
>>
endobj
3 0 obj % 1st page
<< /Type /Page
/Parent 2 0 R
/MediaBox [0 612 792]
/Contents 6 0 R
>>
endobj
6 0 obj % Page contents
<< /Length 35 >>
stream
*** Encrypted Page-marking operators ***
endstream
endobj
12 0 obj %XML Stream
<</Length 450
>>
Stream
<?xml version="1.0" encoding="Windows-1252"?>
<message timestamp_gmt="21102006-103540" seq_no="1" sender="bob@jabber.org">Hi Alice!</message>
<message         timestamp_gmt="21102006-103556"         seq_no="1" sender="alice@jabber.org">Hi Bob!</message>
<message         timestamp_gmt="21102006-103621"         seq_no="2" sender="bob@jabber.org">So howz everything going?</message>
<message         timestamp_gmt="21102006-103740"         seq_no="2" sender="alice@jabber.org">Great!</message>
<message         timestamp_gmt="21102006-103810"         seq_no="3" sender="bob@jabber.org">Ok, see you later. Am signing off</message>
<message         timestamp_gmt="21102006-103853"         seq_no="3" sender="alice@jabber.org">Ok, Later!</message>
endstream
13 0 obj % Message dictionary
<< /Length 128
/P Jabber
/Participants [(alice@jabber.org)
(bob@jabber.org)]
/DocName (Document Just for you!)
/DocID (12439848293)
/Contents 12 0 R
>>
xref
...
trailer
<< /Size 8
/Root 1 0 R
/Discuss 13 0 R
...
>>
startxref
495
%%EOF
```

As shown in FIG. 9, a sequence of events 900 commences with Bob opening the document (operation 902) and chooses to discuss the document (operation 904). Alice agrees to discuss the document with Bob (operation 906). At operations 908 and 910 Bob sees that Alice s on-line and types a greeting for Alice. Alice opens the document (operation 912), sees that Bob is on-line (operation 914) and types a greeting for Bob (operation 916). Bob and Alice exchange messages (operations 918-924) until Bob clicks a "Leave Discussion" control button provided with the viewing application. Alice sees Bob being off-line (operation 928). The viewer application associated with Bob embeds the discussion as an XML stream in the document (operation 930). The viewer application associated with Alice embeds the discussion as an XML stream in the document (operation 932).

In one example embodiment, the complete messaging system may be implemented as a plug-in, e.g., a separate Acrobat® plug-in. The messaging plug-in may implement the messaging protocol client and user interface elements. In the embodiment where the messaging plug-in is an Acrobat® plug-in, some changes in the PDF library (e.g., the PDF parsing module) may be made to accommodate the proposed changes in the PDF specification. The messaging plug-in may use these interfaces for reading and writing to a PDF file. A configuration tab may be added to the Acrobat® Preferences dialog, which may allow the user to set messaging-related configuration options, such as preferred messaging protocols, messaging server addresses, ports and other connection settings. A chat window may be placed on the side or below the document, or it may be a dockable floating window, which the user can place anywhere he pleases.

Some example embodiments described herein may be extended in several ways, as listed below.

- The method and system for document-driven message-based communication may be enhanced to permit users to engage in secure message-based communications. In one example embodiment, the messages that are being exchanged by participants may be encrypted, e.g., using a public-private key algorithm.
- The method and system for document-driven message-based communications may be enhanced to permit voice based communication between the participants. This feature may be implemented as an optional extension to the text-based method and system for document-driven message-based communications way. Existing messaging protocols provide support for voice, which may be leveraged in implementing this extension.
- The method and system for document-driven message-based communications may be enhanced to provide additional security features, where any user may be permitted to open the document, but only authorized users may be permitted to engage in communication. This extension can be achieved, e.g., by encrypting the message dictionary using the public key of the authorized users.
- The method and system for document-driven message-based communications may be enhanced by allowing any annotation added to the document by a participant to be sent to other users during the document-driven communications session. A participant that joins the session when some of the annotations have already been added to the document may be able to synchronize her version of the document with the latest version that includes all annotations.
- The method and system for document-driven message-based communications may be extended by permitting email-based communications between participants.
- The method and system for document-driven message-based communications may be extended by permitting participants to digitally sign the document and the chat messages at the completion of the document driven communications session.
- The method and system for document-driven message-based communications may be extended by permitting asynchronous updating of real time communications messages. For example, after a message has been sent by a participant, the participant may send an update to that message, such that the other participants may receive the updated version of the message.
- The method and system for document-driven message-based communications may be extended by permitting users to broadcast a hash value with every message that is being sent by the user in order to allow the other users to verify that the messages have not been altered (e.g., during synchronization, when the user who is the source of the messages was offline).

Figure 10:
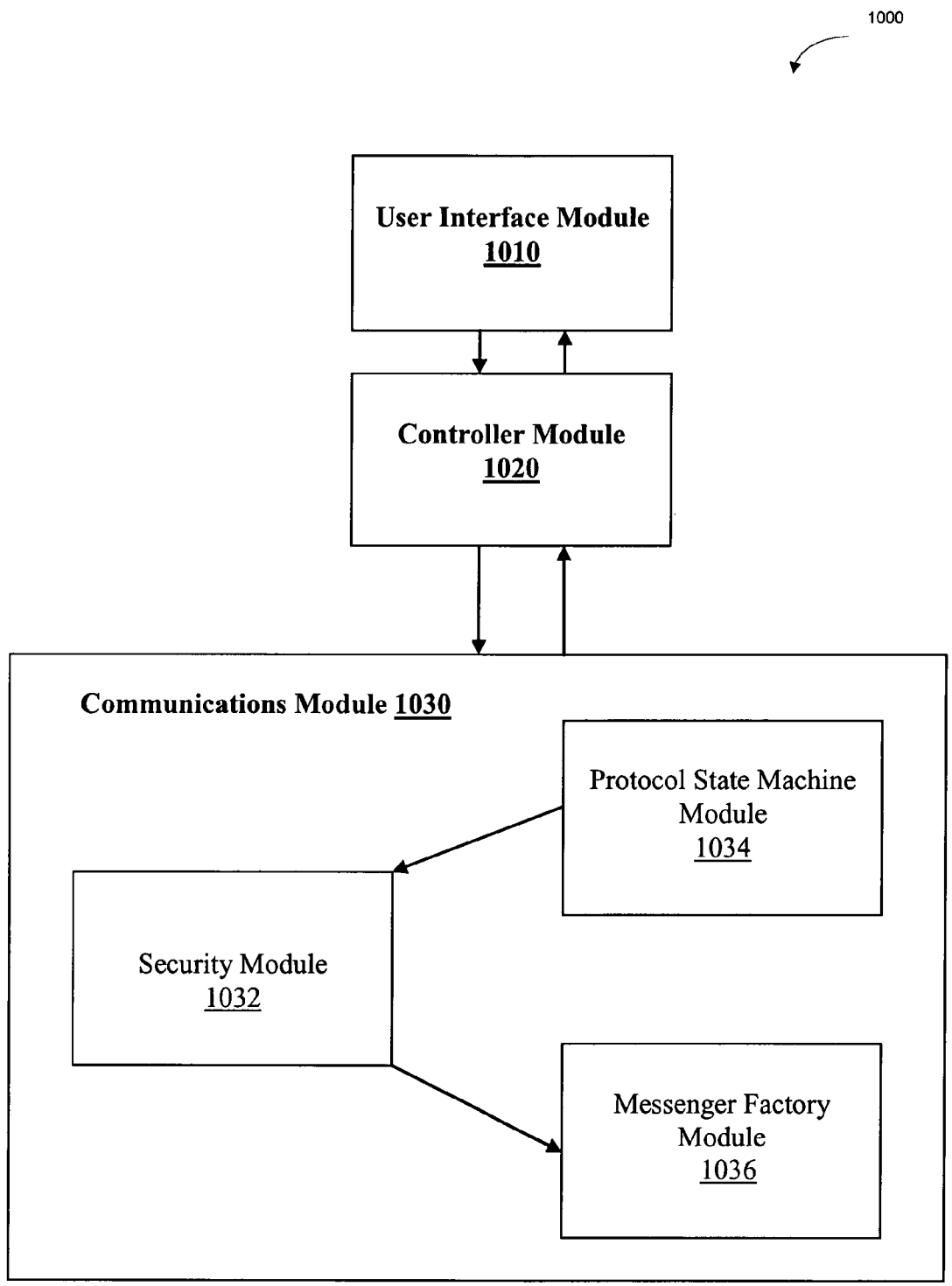
FIG. 10 is block diagram illustrating example architecture of a document-driven message-based communications plug-in, in accordance with an example embodiment.

FIG. 10 is block diagram illustrating example architecture 1000 of a document-driven message-based communications plug-in, in accordance with an example embodiment. The architecture 1000 may include a UI module 1010, a controller module 1020, and a communications module 1030. The UI module 1010 implements the user interface elements of the messaging plug-in. The user interface elements may include a chat window interface and the associated dialogs. The controller module 1020 may be configured to be responsible for handling events generated by a user while interacting with the UI module 1010. For example, events generated on clicking a Send control button, a Log-Off control button, etc. may be handled by the controller module 1020.

The communications module 1030 may be configured to be responsible for the entire communications with other chat-enabled documents.

The communications module 1030 may include a security module 1032, a protocol state machine module 1034, and a messenger factory module 1036. The security module 1032 may be configured to be responsible for user authentication and encryption/decryption chat messages in case of secure communications. The security module 1032 may also be responsible for all other security-related activities. The protocol state machine module 1034 may implement the protocol state machine of the messaging plug-in 1000, and may be configured to handle the receiving, sending, and synchronization of various messages.

The messenger factory module 1036 may be configured to implement an interface between a viewing application and a messaging server. There may be a separate implementation for the messenger factory module 1036 for each supported messaging protocol.

It will be noted, that, while an example document-driven message-based technique for collaborating on an electronic document was described in the context of discussing documents in PDF format, the above-mentioned technique may be utilized advantageously in environments where electronics documents are presented in a variety of formats, utilizing various applications for creating, viewing, and manipulating electronic documents.

In one example embodiment, the method and system to provide document-driven real-time communications maybe implemented in the context of applications that permit users to create, access, and manipulate electronic documents in a Portable Document Format (PDF). It will be noted, however, that the method and system to provide document-driven real-time communications may also be utilized advantageously with a variety of other applications that permit users to create, access, and manipulate electronic documents.

Below is the list of some differences between an example document-driven message-based approach (a document-driven chat) and one existing chat service (an HTML-based chat service). HTML refers to Hypertext Markup Language.

1. HTML-based chat is not document-driven. In other words, the HTML page itself does not contain the required information for an RTC session to take place.
2. In a document-driven RTC session the messages that are exchanged are saved along with the document. In HTML-based chat the messages are stored completely independently.
3. In a document-driven approach, a participant may be permitted to create messages while off-line, so that the messages may be later synchronized with messages generated by other participants. This is not possible with HTML-based chat.
4. In a document-driven approach, a user doesn't need to be on-line in order to access messages related to previous discussion of a document. HTML-based chat, on the other hand, is completely server dependent.
5. In a document-driven approach even if the messaging server is changed (this can be done by changing connection preferences of the participants in the viewing application), the earlier discussions are not altered in any way. In HTML-based chat it is not possible to switch servers without compromising the record of discussion.

6. Document-driven approach may allow for a discussion among more than two participants. This feature is generally not supported in HTML-based chat. Moreover, the mechanism in document-driven chat allows participants to go off-line at will and then return to catch up with what is discussed.

Figure 11:
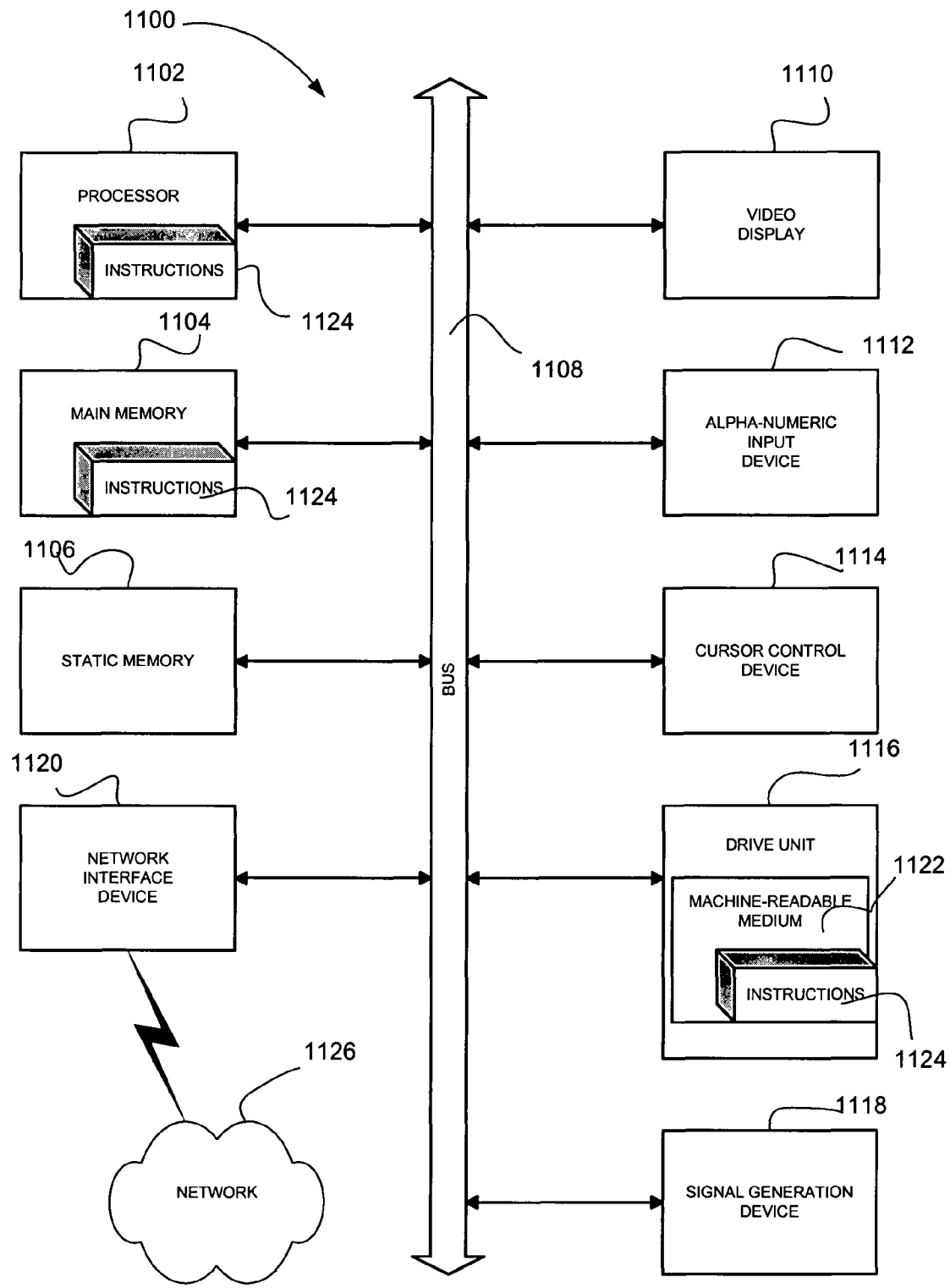
FIG. 11 illustrates a diagrammatic representation of a machine in the example form of a computer system within which a set of instructions, for causing the machine to perform any one or more of the methodologies discussed herein, may be executed.

FIG. 11 is a diagrammatic representation of a machine in the example electronic form of a computer system 1100 within which a set of instructions, for causing the machine to perform any one or more of the methodologies discussed herein, may be executed.

In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an "Moving Picture Experts Group (MPEG) Layer 3" (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a user interface (UI) navigation device 1114 (e.g., a mouse), a disk drive unit 1116, a signal generation device 1118 (e.g., a speaker) and a network interface device 1120.

The disk drive unit 1116 includes a machine-readable medium 1122 on which is stored one or more sets of instructions and data structures (e.g., software 1124) embodying or utilized by any one or more of the methodologies or functions described herein. The software 1124 may also reside, completely or at least partially, within the main memory 1104 and/or within the processor 1102 during execution thereof by the computer system 1100, the main memory 1104 and the processor 1102 also constituting machine-readable media.

The software 1124 may further be transmitted or received over a network 1126 via the network interface device 1120 utilizing any one of a number of well-known transfer protocols (e.g., Hyper Text Transfer Protocol (HTTP)).

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such medium may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Thus, a method and system to provide document-driven message-based communications in the context of an application for creating, viewing, and manipulating electronic documents have been described. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A system comprising:
    a memory; and
    one or more processors coupled to the memory and, the one or more processors implementing:
        a presentation module to open a subject electronic document,
        an attribute detector to detect presence of a discuss attribute in the subject electronic document that was opened by the presentation module, the discuss attribute indicating that the subject electronic document is a message-enabled document and specifying a messaging protocol for initiating a real-time communication (RTC) with respect to the message-enabled document, and
        an RTC module to:
            send one or more open request messages inviting at least one user to join the RTC session with respect to the message-enabled document subsequent in response to the detecting of the presence of the discuss attribute in the subject electronic document and
            in response to receiving an open-reply message from a second electronic system associated with the at least one user, initiate the RTC session with the second electronic system using the messaging protocol specified in the discuss attribute, and
        a storing module to store one or more RTC messages generated during the RTC session inside the subject electronic document.

2. The system of claim 1 comprising:
    a participants detector to parse a list of participants associated with the subject electronic document to determine a user associated with the second electronic system; and
    a chat user interface (UI) module to display on-line status of the user associated with the second electronic system from the list of participants.

3. The system of claim 2, wherein the RTC module is to send a request to open an instance of the subject electronic document to the user associated with the second electronic system from the list of participants.

4. The system of claim 1, wherein the RTC module is to initiate the RTC session in response to an indication from the first electronic system.

5. The system of claim 1 comprising a messaging protocol detector to determine the messaging protocol associated with the subject electronic document.

6. The system of claim 5, wherein the determined messaging protocol is Jabber communications protocol.

7. The system of claim 1, wherein the presentation module is to:
   detect one or more messages from an earlier RTC session, the one or more messages from the earlier RTC session being associated with the subject electronic document; and
   present the one or more messages from the earlier RTC session to a user associated with the first electronic system.

8. The system of claim 1 comprising a synchronization module to:
   receive a synchronization request from the second electronic system;
   determine one or more requested messages from the synchronization request; and
   provide the one or more requested messages to the second electronic system.

9. The system of claim 1, wherein the RTC module is to support voice communications.

10. The system of claim 1, wherein the attribute detector is to parse one or more properties associated with the subject electronic document to detect the discuss attribute.

11. A method comprising:
   opening a subject electronic document;
   detecting presence of a discuss attribute in the subject electronic document, the discuss attribute indicating that the subject electronic document is a message-enabled document and specifying a messaging protocol for initiating a real-time communication (RTC) session with respect to the message-enabled document;
   sending one or more open request messages inviting at least one user to join the RTC session with respect to the message-enabled document subsequent to the detecting of the presence of the discuss attribute in the subject electronic document;
   in response to receiving an open-reply message from a second electronic system associated with the at least one user, initiating the RTC session with the second electronic system utilizing the messaging protocol specified in the discuss attribute; and
   storing one or more RTC messages generated during the RTC session inside the subject electronic document.

12. The method of claim 11 comprising:
   parsing a list of participants associated with the subject electronic document to determine a user associated with the second electronic system; and
   displaying on-line status of the user associated with the second electronic system from the list of participants.

13. The method of claim 12, wherein the initiating of the RTC session includes sending a request to open an instance of the subject electronic document to the user associated with the second electronic system from the list of participants.

14. The method of claim 11, wherein the initiating of the RTC session is in response to an indication from the first electronic system.

15. The method of claim 11 comprising determining a messaging protocol associated with the subject electronic document.

16. The method of claim 15, wherein the determined messaging protocol is Jabber communications protocol.

17. The method of claim 11, wherein the opening of the subject electronic document comprises:
   detecting one or more messages from an earlier RTC session, the one or more messages from the earlier RTC session being associated with the subject electronic document; and
   presenting the one or more messages from the earlier RTC session to a user associated with the first electronic system.

18. The method of claim 11 comprising:
   receiving a synchronization request from the second electronic system;
   determining one or more requested messages from the synchronization request; and
   providing the one or more requested messages to the second electronic system.

19. The method of claim 11, wherein the detecting that the subject electronic document is a message-enabled document includes parsing one or more properties associated with the subject electronic document to detect the discuss attribute.

20. A machine-readable non-transitory storage medium having instruction data to cause a machine to:
   open a subject electronic document,
   detect presence of a discuss attribute in the subject electronic document that was opened by the presentation module, the discuss attribute indicating that the subject electronic document is a message-enabled document and further specifying a messaging protocol for initiating a real-time communication (RTC) with respect to the message-enabled document,
   send one or more open request messages inviting at least one user to join RTC session with respect to the message-enabled document subsequent to the detecting of the presence of the discuss attribute in the subject electronic document,
   in response to receiving an open-reply message from a second electronic system associated with the at least one user, initiating the RTC session with the second electronic system utilizing the messaging protocol specified in the discuss attribute; and
   store one or more RTC messages generated during the RTC session inside the subject electronic document.

* * * * *